United States Patent
Albert et al.

(10) Patent No.: US 7,843,958 B2
(45) Date of Patent: Nov. 30, 2010

(54) RESOLVING A LAYER 3 ADDRESS IN A PROCESSOR SYSTEM WITH A UNIFIED IP PRESENCE

(75) Inventors: Mark Albert, Cary, NC (US); Chris O'Rourke, Apex, NC (US); Richard L. Gray, Cary, NC (US); Walter G. Dixon, Fuquay Varina, NC (US); Tzu-Ming Tsang, Chapel Hill, NC (US); Wai-tak Siu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 11/755,253

(22) Filed: May 30, 2007

(65) Prior Publication Data

US 2008/0301407 A1    Dec. 4, 2008

(51) Int. Cl.
*H04J 3/00*     (2006.01)
(52) U.S. Cl. ...................................... 370/464
(58) Field of Classification Search ........................ None
See application file for complete search history.

(56) References Cited

U.S. PATENT DOCUMENTS

| | | | | |
|---|---|---|---|---|
| 6,804,236 | B1* | 10/2004 | Mahajan et al. | 370/390 |
| 7,197,046 | B1* | 3/2007 | Hariharasubrahmanian | 370/466 |
| 7,411,916 | B2* | 8/2008 | Sakov et al. | 370/252 |
| 2003/0035439 | A1* | 2/2003 | Watanabe | 370/466 |
| 2004/0008728 | A1* | 1/2004 | Lee | 370/474 |
| 2006/0095719 | A1* | 5/2006 | Tsai | 712/34 |
| 2006/0268766 | A1* | 11/2006 | Rangarajan et al. | 370/328 |
| 2007/0014276 | A1* | 1/2007 | Bettink et al. | 370/351 |
| 2007/0115967 | A1* | 5/2007 | Vandenberghe et al. | 370/389 |
| 2008/0112362 | A1* | 5/2008 | Korus | 370/331 |
| 2008/0225867 | A1* | 9/2008 | Sehgal et al. | 370/401 |
| 2008/0285565 | A1* | 11/2008 | Gunther | 370/394 |
| 2008/0301407 | A1* | 12/2008 | Albert et al. | 712/31 |
| 2009/0073972 | A1* | 3/2009 | Lee et al. | 370/389 |
| 2009/0161600 | A1* | 6/2009 | Sato et al. | 370/328 |

OTHER PUBLICATIONS

"How to Choose the Best Router Switching Path for Your Network", Document ID: 13706, Cisco Systems, Inc., http://www.cisco.com, 10 pages, May 16, 2005.
"Troubleshooting Load Balancing Over Parallel Links Using Cisco Express Forwarding", Document ID: 18285, Cisco Systems, Inc., http://www.cisco.com, 16 pages, Aug. 8, 2005.

* cited by examiner

*Primary Examiner*—Chi H Pham
*Assistant Examiner*—Fan Ng
(74) *Attorney, Agent, or Firm*—Baker Botts L.L.P.

(57) ABSTRACT

Resolving a Layer 3 address includes maintaining an address resolution table at each slave processor of a number of slave processors. The slave processors have a master processor, and the master processor and the slave processors are associated with a unified address. An address resolution table includes one or more Layer 2-Layer 3 address mappings. An address resolution request requesting a Layer 2 address corresponding to a Layer 3 address is sent from a slave processor. The address resolution request uses the unified address. An address resolution response comprising the Layer 2 address is received at the master processor. The master processor sends the response to the slaves.

18 Claims, 2 Drawing Sheets

RESOLVING A LAYER 3 ADDRESS IN A PROCESSOR SYSTEM WITH A UNIFIED IP PRESENCE

TECHNICAL FIELD

This invention relates generally to the field of telecommunications and more specifically to resolving a Layer 3 address in a processor system with a unified IP presence.

BACKGROUND

Communication systems include processors that route packets. Certain processors route packets to a next hop identified by a Layer 3 address by directing the packets to hardware identified by a Layer 2 address. A processor performs address resolution to translate the Layer 3 address to the corresponding Layer 2 address. Address resolution involves processes such as looking up the corresponding Layer 2 address in an address resolution table or requesting information about the Layer 2 address.

SUMMARY OF THE DISCLOSURE

In accordance with the present invention, disadvantages and problems associated with previous techniques for performing address resolution may be reduced or eliminated.

According to one embodiment of the present invention, resolving a Layer 3 address includes maintaining an address resolution table at each slave processor of a number of slave processors. The slave processors have a master processor, and the master processor and the slave processors are associated with a unified address. An address resolution table includes one or more Layer 2-Layer 3 address mappings. An address resolution request requesting a Layer 2 address corresponding to a Layer 3 address is sent from a slave processor. The address resolution request uses the unified address as the source address. An address resolution response comprising the Layer 2 address is received at the master processor.

Certain embodiments of the invention may provide one or more technical advantages. A technical advantage of one embodiment may be that address resolution may be performed in a processor system with a unified IP presence. In the processor system, a master processor and associated slave processors have the same unified IP address. Each processor has its own address resolution table that maps Layer 3 address to corresponding Layer 2 addresses.

Another technical advantage of one embodiment may be that the address resolution tables may be efficiently updated. A slave processor sends an address resolution request requesting a Layer 2 address corresponding to a Layer 3 address. The address resolution request includes the unified IP address. The master processor receives the address resolution response that includes Layer 2 address, and sends the Layer 2 address to the slave processors to allow the slave processors to update their address resolution tables.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
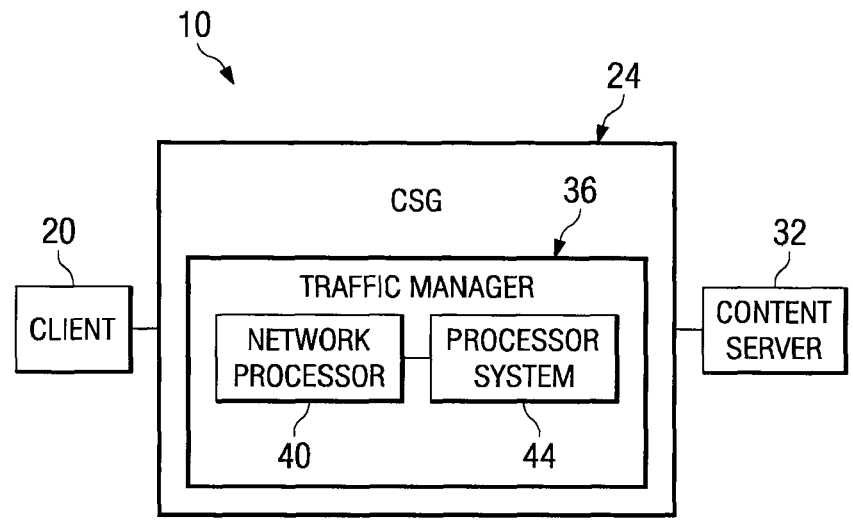
FIG. 1 illustrates one embodiment of a system that includes a processor system with a unified Internet Protocol (IP) presence.
Figure 2:
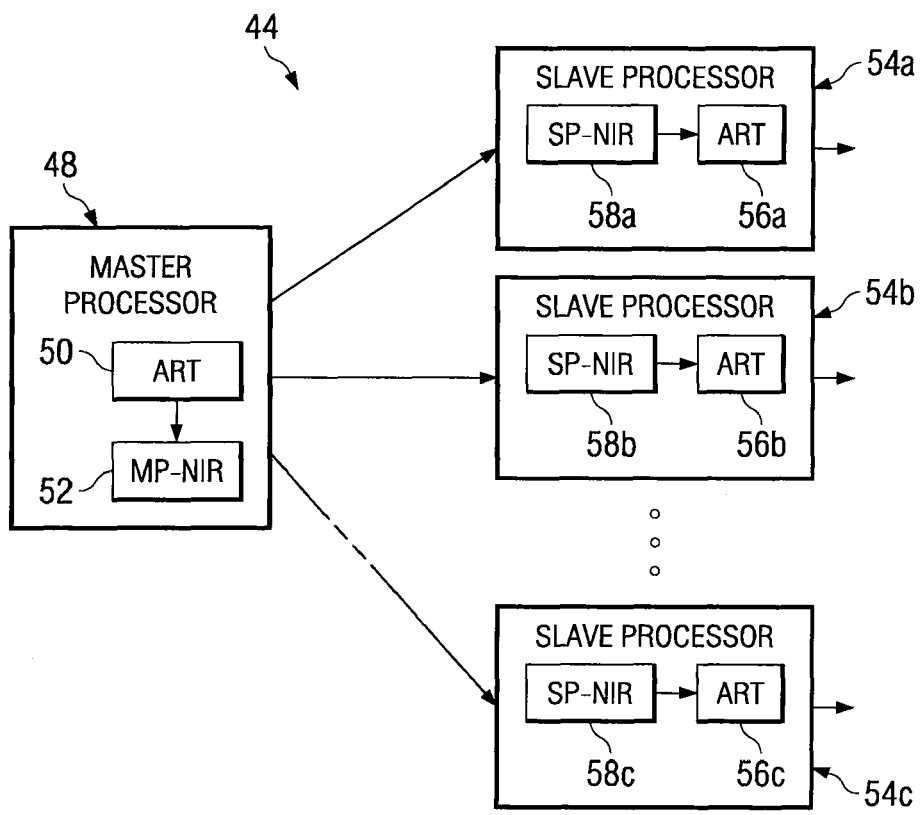
FIG. 2 illustrates one embodiment of a processor system that may be used with the system of FIG. 1.
Figure 3:
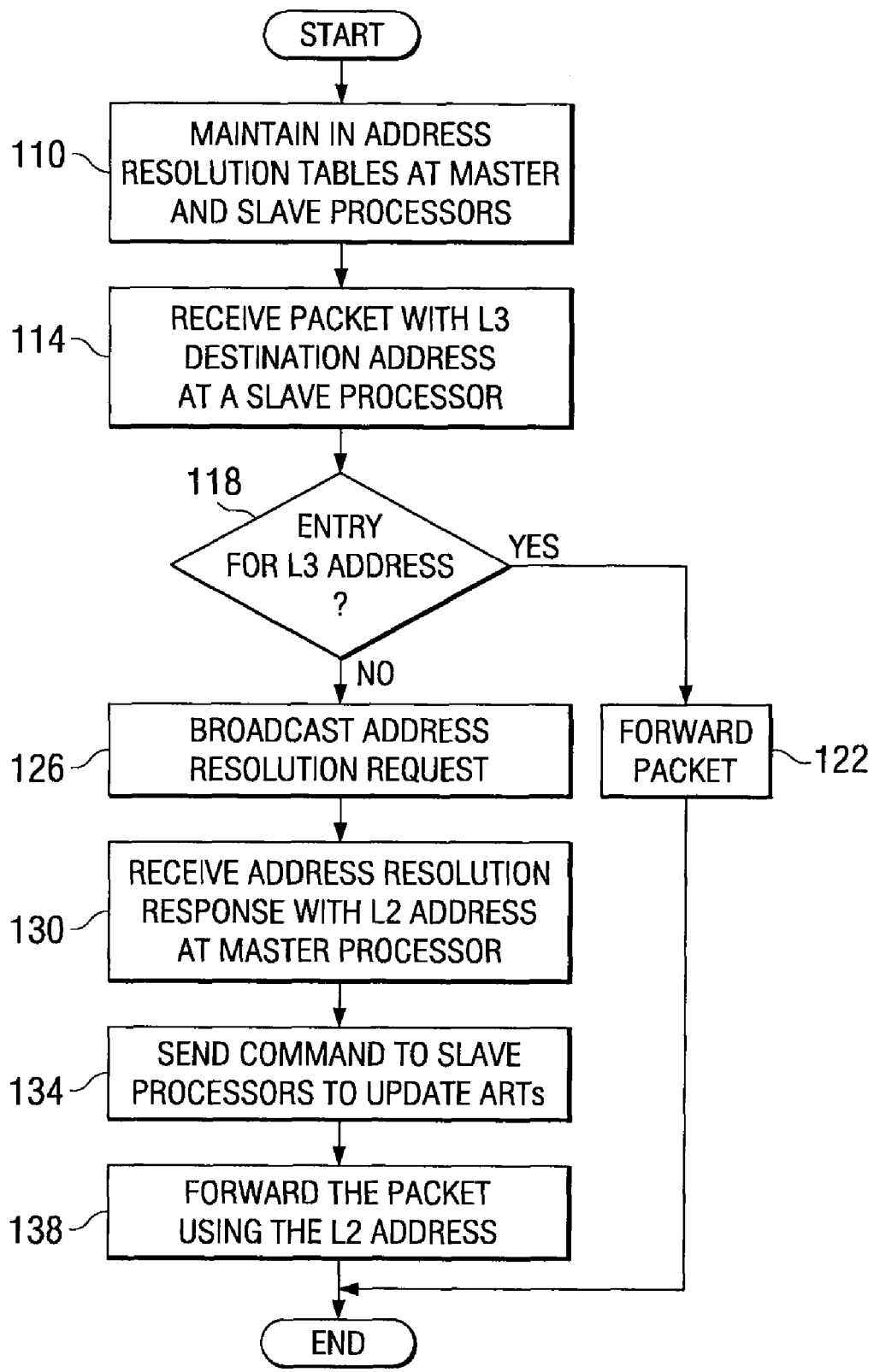
FIG. 3 illustrates one embodiment of a method for resolving an address that may be used by the system of FIG. 1.

Embodiments of the present invention and its advantages are best understood by referring to FIGS. 1 through 3 of the drawings, like numerals being used for like and corresponding parts of the various drawings.

FIG. 1 illustrates one embodiment of a system 10 that includes a processor system 44 with a unified Internet Protocol (IP) presence. In the embodiment, processor system 44 has a master processor and associated slave processors with the same unified IP address. The processors have address resolution tables that may be efficiently updated. A slave processor sends an address resolution request requesting a Layer 2 address corresponding to a Layer 3 address. The address resolution request includes the unified IP address. The master processor receives the address resolution response that includes Layer 2 address, and sends the Layer 2 address to the slave processors to allow the slave processors to update their address resolution tables.

In the illustrated embodiment, system 10 includes a client 20, a content services gateway (CSG) 24, and a content server (CS) 32 coupled as shown. Content services gateway 24 includes a traffic manager 36 that in turn includes a network processor 40 and processor system 44. In one embodiment of operation, client 20 requests content from content server 32. Content services gateway 24 processes the requests from client 20.

In one embodiment, client 20 represents any suitable device operable to communicate with communication system 10. Examples of client 20 include a telephone, a personal digital assistant, a computer, a mobile handset, or any other device operable to communicate with system 10. Client 20 may be used by or otherwise associated with a user. A user refers to an entity (for example, a person, computer system, or company) that has a user account. A user may be identified by a user identifier.

System 10 provides communication sessions to clients 20. A communication session may refer to an active communication of packets. During a communication session, a service may be provided to client 20. For example, content server 32 provides content to client 20 as part of a content service. Information may be communicated during a service. Information may refer to voice, data, text, audio, video, multimedia, control, signaling, other information, or any combination of any of the preceding.

Content services gateway 24 processes data packets received from client 20 and determines the disposition of the packets. For example, a packet may be forwarded to the packet's next hop, dropped, or redirected to another location. In one embodiment, a data packet comprises a content request that requests content from content server 32 on the behalf of a user. Content services gateway 24 determines whether the user is allowed access to the content. If the user is allowed access, content services gateway 24 forwards the content request to content server 32. If the user is not allowed access, content services gateway 24 drops the content request or redirects the content request to another location.

Traffic manager 36 manages packet traffic between a network interface and a switch fabric, and decides where, when, and how incoming and outgoing packets are sent. Network processor 40 supports the implementation of network protocols. Processor system 44 directs packets to specified destinations, such as the next hops for the packets. The processors may be embodied as line cards.

In one embodiment, processor system 44 includes a master processor and one or more slave processors. In the embodiment, the processors of processor system 44 are assigned the same unified address, such as the same media access control (MAC) and/or Internet Protocol (IP) address. In one embodiment, each processor has an address resolution table that may be used to direct a packet with a Layer 3 next hop address to the appropriate Layer 2 next hop address. In the embodiment, the address resolution tables may be efficiently updated, as described in more detail with reference to FIGS. 2 and 3.

Content server 32 represents an entity that provides content to users as part of a content service. Content server 32 may include a server that may be accessed by client 20.

System 10 may include one or more networks that allow the components of system to communicate. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

System 10 may utilize any suitable communication protocols and/or technologies. Examples of communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, or other standards. In one embodiment, system 10 may utilize ETSI communication protocols such as Global System for Mobile Communications (GSM) protocols that use General Packet Radio Services (GPRS) tunneling protocol.

A device of system 10 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic is embodied in a computer-readable medium and executed by a computer. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated. Moreover, the operations of system 10 may be performed by more, fewer, or other components. Additionally, operations of system 10 may be performed using any suitable logic. As used in this document, "each" refers to each member of a set or each member of a subset of a set.

FIG. 2 illustrates one embodiment of processor system 44 that may be used with system 10 of FIG. 1. In the embodiment, processor system 44 includes a master processor 48 and one or more slave processors 54. Master processor 48 includes an address resolution table (ART) 50 and master processor network information replicator (MP-NIR) 52. A slave processor 54 includes an address resolution table (ART) 56 and slave processor network information replicator (SP-NIR) 58.

Master processor 48 operates as a control processor that manages the distribution of packets to slave processors 54, which operate as traffic processors that route packets. In one embodiment, processors 48 and 54 of processor system 44 are assigned the same unified address. A unified address may be a media access control (MAC) and/or Internet Protocol (IP) address.

Master processor 48 manages the entries of address resolution tables 50 and 56. The entries include Layer 2-Layer 3 address mappings. A Layer 2-Layer 3 address mapping maps a Layer 3 address to a Layer 2 address of hardware (such as a port) that leads to the next hop identified by the Layer 3 address. Layer 2 (L2) and Layer 3 (L3) may be as described in the Open Systems Interconnection Basic Reference Model (OSI Model). A Layer 2 address may be a data link layer address, such as a MAC address, and a Layer 3 address may be a network layer address, such as an IP address.

Master processor 48 manages the entries by instructing slave processors 54 to create, delete, update, and/or otherwise modify entries. MP-NIR 52 of master processor 48 may provide such instruction in encoded commands that include entries to be modified. In one embodiment, MP-NIR 52 may register with address resolution components to receive notification concerning entry modification such as entry creation, updating, and/or deletion.

In response to a notification, MP-NIR 52 sends a command to slave processors 54 to perform the entry modification at their respective address resolution tables 56. The commands may be sent using a high speed interprocess communication (IPC) protocol, and may be batched for bulk propagation to slave processors 54 at any suitable time, for example, one, two, three, or more times per second or when the buffer is full. The commands may be sent such that address resolution table 52 of master processor 48 may be closely synchronized with address resolution table 56 of slave processors 54.

SP-NIR 58 receives the commands from master processors 48, and applies the commands to slave processors 54 to create, update, delete, and/or otherwise modify entries of address resolution table 56. SP-NIR 58 may register with IPC components to receive commands from MP-NIR 52 over an IPC port.

In certain cases, processor 48 or 54 may need to obtain an entry. For example, processor 48 or 54 may need an updated entry for an entry that is about to time out. As another example, processor 48 or 54 may need an entry to send a packet with a Layer 3 address for which processor 48 or 54 does not have a known Layer 2 encapsulation in its address resolution table 50.

To obtain an entry, processor 48 or 54 sends an address resolution request. Address resolution request requests a Layer 2 address corresponding to a Layer 3 address. Processor 48 or 54 broadcasts the address resolution request to the local network. The device identified by the Layer 2/Layer 3 address may receive the request and send an address resolution response that includes the requested Layer 2 address. In one embodiment, the address resolution request uses the unified address as the address where the address resolution response is to be sent, for example, the source address. In the embodiment, network processor 40 identifies the address resolution response and delivers it to master processor 48.

In one embodiment, address resolution tables 50 and 56 may be updated. A slave processor 54 sends an address resolution request requesting a Layer 2 address corresponding to a Layer 3 address. The address resolution request includes the unified IP address. Master processor 48 receives the address resolution response that includes Layer 2 address, and sends the Layer 2 address to slave processors 54 to allow slave processors 54 to update their address resolution tables 56.

Modifications, additions, or omissions may be made to processor system 44 without departing from the scope of the invention. The components of processor system 44 may be integrated or separated. Moreover, the operations of processor system 44 may be performed by more, fewer, or other components. Additionally, operations of processor system 44 may be performed using any suitable logic.

FIG. 3 illustrates one embodiment of a method for resolving an address that may be used by system 10 of FIG. 1. Address resolution tables 50 and 56 are maintained at master processor 48 and slave processors 54 at step 110. A slave processor 54a receives a packet with a Layer 3 next hop address at step 114.

Slave processor 54a determines whether there is an entry in address resolution table 56a for the Layer 3 address at step 118. If there is an entry for the Layer 3 address, the method proceeds to step 122, where slave processor 54a forwards the packet using the Layer 2 address indicated by the Layer 2-Layer 3 address mapping. The method then terminates.

If there is no entry for the Layer 3 address at step 118, the method proceeds to step 126. Slave processor 54a broadcasts an address resolution request at step 126 to request a Layer 2 address for the Layer 3 address. Slave processor 54a may broadcast the request to Ethernet media. The address resolution request uses the unified address as the source address in order to direct the response to master processor 48.

Master processor 48 receives the address resolution response at step 130. The address resolution response includes the Layer 2 address for the Layer 3 address. Master processor 48 sends a command with the Layer 2-Layer 3 mapping for the Layer 2 address to the slave processors 54 at step 134. The slave processors 54 update their address resolution tables 56 in accordance with the command. Slave processor 54a forwards the packet using the Layer 2 address indicated by the updated address resolution tables 56a at step 138. After forwarding the packet, the method terminates.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that address resolution may be performed in a processor system with a unified IP presence. In the processor system, a master processor and associated slave processors have the same unified IP address. Each processor has its own address resolution table that maps Layer 3 address to corresponding Layer 2 addresses.

Another technical advantage of one embodiment may be that the address resolution tables may be efficiently updated. A slave processor sends an address resolution request requesting a Layer 2 address corresponding to a Layer 3 address. The address resolution request includes the unified IP address. The master processor receives the address resolution response that includes Layer 2 address, and sends the Layer 2 address to the slave processors to allow the slave processors to update their address resolution tables.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for resolving a Layer 3 address, comprising:
maintaining an address resolution table at each slave processor of a plurality of slave processors, the slave processors embodied as a plurality of line cards of a device, the plurality of slave processors having a master processor embodied as a line card of the device, the master processor distinct from the slave processors, the master processor and the plurality of slave processors assigned a same unified address to direct a plurality of packets to the master processor, the master processor configured to receive the packets and distribute the packets to the slave processors, the address resolution table comprising one or more Layer 2-Layer 3 address mappings;
receiving a packet having a next hop address comprising the Layer 3 address; and
broadcasting an address resolution request from a slave processor to Ethernet media in response to establishing that the address resolution table of the slave processor fails to include an entry for the Layer 3 address, the address resolution request requesting a Layer 2 address corresponding to the Layer 3 address, the address resolution request indicating that an address resolution response comprising the Layer 2 address should be sent to the master processor using the unified address.

2. The method of claim 1, wherein:
the Layer 2 address comprises an Media Access Control (MAC) address; and
the Layer 3 address comprises an Internet Protocol (IP) address.

3. The method of claim 1, further comprising:
sending a command comprising the Layer 2 address to the plurality of slave processors to update the address resolution tables of the plurality of slave processors.

4. The method of claim 1, wherein broadcasting the address resolution request from the slave processor of the plurality of slave processors further comprises:
broadcasting the address resolution request to the local network.

5. The method of claim 1, wherein the address resolution response comprises the unified address, the unified address directing the address resolution response to the master processor.

6. The method of claim 1, further comprising:
forwarding a packet having the Layer 3 address using the Layer 2 address.

7. A processor system of a device, the processor system operable to resolve a Layer 3 address, comprising:
a plurality of slave processors, each slave processor embodied as a line card of the device and coupled to a master processor, the master processor embodied as a line card of the device and distinct from the slave processors, the master processor and the plurality of slave processors assigned a same unified address to direct a plurality of packets to the master processor, the master processor configured to receive the packets and distribute the packets to the slave processors, each slave processor configured to:

maintain an address resolution table comprising one or more Layer 2-Layer 3 address mappings, a slave processor of the plurality of slave processors configured to:

receive a packet having a next hop address comprising the Layer 3 address; and broadcast an address resolution request to Ethernet media in response to establishing that the address resolution table of the slave processor fails to include an entry for the Layer 3 address, the request requesting a Layer 2 address corresponding to the Layer 3 address, the address resolution request indicating that an address resolution response comprising the Layer 2 address should be sent to the master processor using the unified address.

8. The system of claim 7, wherein:
the Layer 2 address comprises an Media Access Control (MAC) address; and
the Layer 3 address comprises an Internet Protocol (IP) address.

9. The system of claim 7, the master processor further operable to:
send a command comprising the Layer 2 address to the plurality of slave processors to update the address resolution tables of the plurality of slave processors.

10. The system of claim 7, the slave processor of the plurality of slave processors further configured to broadcast the address resolution request by:
broadcasting the address resolution request to the local network.

11. The system of claim 7, wherein the address resolution response comprises the unified address, the unified address directing the address resolution response to the master processor.

12. The system of claim 7, the slave processor of the plurality of slave processors further configured to:
forward a packet having the Layer 3 address using the Layer 2 address.

13. A non-transitory computer-readable medium embodying logic when executed by a computer configured to:

maintain an address resolution table at each slave processor of a plurality of slave processors, the slave processors embodied as a plurality of line cards of a device, the plurality of slave processors having a master processor embodied as a line card of the device, the master processor distinct from the slave processors, the master processor and the plurality of slave processors assigned a same unified address to direct a plurality of packets to the master processor, the master processor configured to receive the packets and distribute the packets to the slave processors, the address resolution table comprising one or more Layer 2-Layer 3 address mappings;

receive a packet having a next hop address comprising the Layer 3 address; broadcast an address resolution request from a slave processor to Ethernet media in response to establishing that the address resolution table of the slave processor fails to include an entry for the Layer 3 address, the address resolution request requesting a Layer 2 address corresponding to the Layer 3 address, the address resolution request indicating that an address resolution response comprising the Layer 2 address should be sent to the master processor using the unified address.

14. The medium of claim 13, wherein:
the Layer 2 address comprises an Media Access Control (MAC) address; and
the Layer 3 address comprises an Internet Protocol (IP) address.

15. The medium of claim 13, further configure to:
send a command comprising the Layer 2 address to the plurality of slave processors to update the address resolution tables of the plurality of slave processors.

16. The medium of claim 13, further configured to broadcast the address resolution request from the slave processor of the plurality of slave processors by:
broadcasting the address resolution request to the local network.

17. The medium of claim 13, wherein the address resolution response comprises the unified address, the unified address directing the address resolution response to the master processor.

18. The medium of claim 13, further configured to: forward a packet having the Layer 3 address using the Layer 2 address.

* * * * *